Nov. 11, 1958 — C. F. BOIGENZOHN — 2,859,597
STEERING DRIVE UNIVERSAL
Filed Feb. 16, 1955

INVENTOR
Charles F. Boigenzohn
BY
ATTORNEY

United States Patent Office 2,859,597
Patented Nov. 11, 1958

2,859,597
STEERING DRIVE UNIVERSAL
Charles F. Boigenzohn, Durand, Wis.
Application February 16, 1955, Serial No. 488,547
1 Claim. (Cl. 64—7)

This invention relates to axle wheel drive systems for vehicles, and pertains more particularly to an improved universal joint forming a part thereof.

Certain universal joints with which I am familiar embody a hub splined to the driving axle. Cooperating with the hub in a circumposed relation is an outer race member having a radius of curvature corresponding to the effective radius of the hub. The driving force is transmitted from the hub to the driven or outer race member by a number (usually six) of steel balls contained in a series of grooves disposed on both the hub and the inner curved face of the outer member, the hub thus forming the inner race.

In that a universal is used in conjunction with each of the wheels employed in steering the vehicle and in that each of the wheels is mounted for turning movement with the aforesaid outer race member having the interior grooves, it will be recognized that the outer race member and wheel may be turned or steered relative to the hub and axle. Since the balls produce only point contact with the groove walls of the respective members, the walls of the grooves become worn by virtue of such restricted surface contact. In actual practice it has been found that sizeable indentations or secondary grooves are worn, and that these indentations result in breakage of the outer races, thereby necessitating repair of the vehicle and the concomitant loss of service of the vehicle during the repair period. Such a situation is of course extremely undesirable regardless of the duty the equipment has been given, because of the repair expense. However, in some instances, such as in snow removal operations, it is mandatory that the vehicle be kept in continuous operation for indefinite periods and breakdowns cannot be tolerated, and it is just this type of service that imposes the heaviest bearing loads upon the universal joints, for the reaction of the snow plow itself produces deflective forces upon the vehicle's steering mechanism that must be resisted by the ball bearings of the universal joints.

Accordingly, one important object of the instant invention is to provide a universal joint capable of shouldering heavy transmission loads over prolonged periods without breakdown.

In effecting the realization of the above object, one feature of the invention resides in the employment of a hub element that is splined to the driving axle in the same manner as heretofore, but which hub element is provided with a plurality of radially projecting lugs. Only the outer race member is grooved and the transmission load is distributed over more of the inner surface of the groove by means of a series of needle bearings surrounding each lug. In a preferred form of the invention, a cup shaped housing serves as a means for retaining the needle bearings in their proper position.

A further feature of the present invention comprises the production of a universal joint having a hub or spider including a series of angularly spaced radially extending lugs supporting bearings and in the provision of a housing including grooves shaped to accommodate these bearings. The grooves are so formed as to provide a driving engagement with the lugs in spite of changes in angularity between the driving and driven shafts.

Other advantages, such as ease of steering, will be made more apparent hereinafter. Accordingly, for a better and more complete understanding of the invention, reference should now be had to the following specification and to the accompanying drawing, in which.

Figures 1, 2, 3:
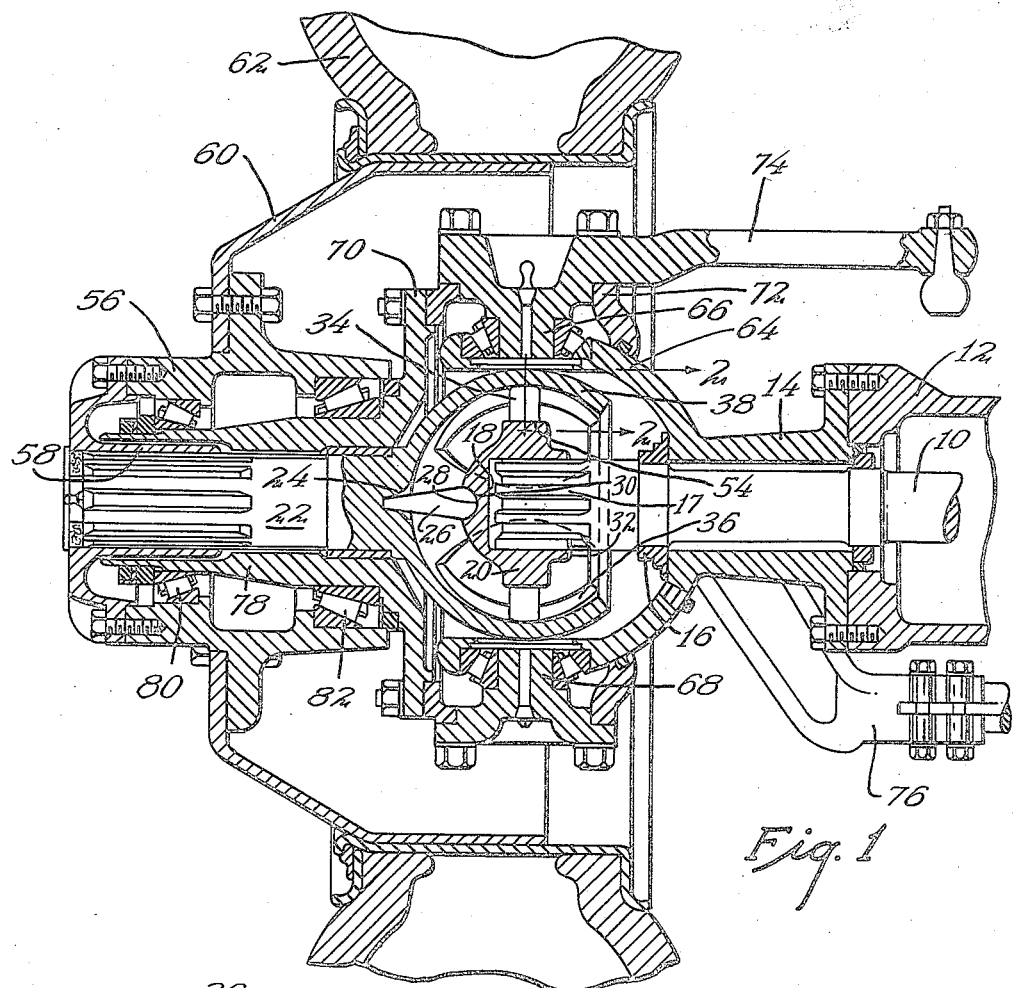
Figure 1 is a vertical section of my invention showing its use with a typical axle and wheel combination.
Figure 2 is an enlarged sectional detail taken in the direction of line 2—2 of Figure 1, the view illustrating fragmentarily the specific subject matter of the present invention.
Figure 3 is a sectional view transversely through the universal joint.

Referring now to Figure 1 of the drawings, it will be observed that considerable environmental background has been illustrated in order that my specific contribution to the prior art may be thoroughly understood and evaluated. A driving axle 10 extends outwardly from an axle housing 12 through a sleeve 14 which is bolted to the housing. An axle retainer 16 assures the proper positioning of the axle 10 with respect to the sleeve 14 and the housing 12.

The axle 10 is provided with spline teeth 17 which mesh with similar teeth contained around the interior of a recess 18 provided in the central portion of a hub or spider 20. A stub shaft 22 forms what might be termed an axial continuation of the axle when the vehicle wheels are straight, as will presently be made more apparent, the shaft 22 being recessed at 24 to receive one end of an aligning plug 26. The opposite end of the plug 26 is rounded at 28 and fits into a complemental recess 30 in the hub 20, thus forming a ball and socket joint. In this way the hub or spider 20 is kept on the axle 10 at the proper position, assuring that the hub 20 is urged against a shoulder 32 formed on the axle 10.

Angularly spaced about the periphery of the hub 20 is a series of radially projecting cylindrical lugs 34, a preferred number of lugs being four. These lugs 34 extend into an equal number of grooves 36 cut into an outer race member 38 circumjacent the hub 20, the member 38 being integral with or mechanically attached to the stub shaft 22. Encircling each lug 34 is a plurality of needle bearings 40 (Figure 2), a cup shaped element 42 retaining these bearings in encircling relation. As shown, the individual cups comprise a base 44, a side wall 46, an inwardly turned flange 48 and an upwardly turned inner flange 50. A neck in the lugs 34, at 52, is provided in order to cause a very slight snap action between the flange 50 and the annular necked groove 52, thereby facilitating assembly in that each cup 42 will be mechanically fastened to its respective lug 34. However, if desired, the flanges 48 and 50 may be dispensed with so that the needle bearings then rest (not shown) at their lower ends upon a shoulder 54 extending around the base of the lugs 34.

As is indicated in Figure 1 of the drawings, the grooves 36 are shaped to compensate for variations in the angularity between the drive shaft and driven shaft. The cup-shaped element 42 fits snugly between the sides 37 and 39 of each groove 36 when the two shafts 10 and 22 are substantially aligned. The groove edges are curved; and as the angularity between the shaft increases, the elements 42 slide along an edge of each groove, providing a constant driving action against an edge of the corresponding groove. In the particular construction shown, the grooves are produced by arcuately edged spherical segments within the outer shell. However, these segments may be integral with the outer shell if preferred. The curvature of the housing tends to accentuate the apparent curvature of the groove edges; but in actual practice the curvature of the groove edges is just sufficient to permit the elements 42 to travel in the grooves regardless of the angularity between the shafts.

The center of arcuation of the groove edges 37 and 39 is normally on a plane normal to the axis of rotation of the housing and through the center of curvature of the spherical housing.

Since the ensuing structure forms no real part of my invention, it will be described rather generally indulging in only sufficient particularity to show the overall functioning of an axle wheel drive incorporating thereinto the details of my specific invention and the part it plays in such system. An external hub 56 is provided with an inwardly extending sleeve 58 which sleeve is splined to the stub shaft 22. A wheel 60, carrying a tire 62, bolts onto the hub 56 in conventional manner.

The sleeve 14 bells outwardly to form a socket member 64 which is part of the housing for the universal joint. A pair of trunnions 66, 68 is suitably carried by the socket member 64, and permits turning of the other housing members 70, 72 relative to the socket member 64, such turning or steering being effected by a steering arm 74. A tie rod 76 connects with a similar wheel arrangement of the other side of the vehicle in a well known manner. It will be seen that the casing member 70 merges into a sleeve 78 encompassing the stub shaft 22 and that two sets of bearings 80, 82 permit relative rotation of the hub 56 with respect to the sleeve 78.

It is thought that the operation will be obvious from the foregoing description. The axle 10 transmits the driving force to the wheel 60 via the hub or spider 20, the lugs 34 carried on this spider, the outer race member 38, the stub shaft 22, the sleeve 58, and the external hub 56 which is mechanically connected to the wheel 60. Any steering movement of the arm 74 is conveyed to the housing member 70 and its sleeve 78 to the stub shaft 22 and the associated outer race member 38. Remembering that Figure 1 is a vertical section and assuming that the vehicle is to be steered to the right, the stub shaft 22 pivots about the two lugs 34 contained in the cups 42 actually visible in this view, the stub shaft 22 pivoting away from the reader. Freedom of turning, however, is permitted in that the grooves 36 are all of sufficient axial length to permit the outer race member 38 to pivot to any desired degree, the grooves 36 not visible permitting this relative pivoting in that the lugs 34 and cups 42 contained in these grooves 36 that are not visible assume relative positions toward the appropriate ends of the several grooves 36. This action is the same in prior art devices, and therefore it is not thought necessary to actually illustrate a position with the wheel 60 turned.

It might be reiterated at this point that it is the repeated turning in prior art apparatus employing ball bearings that produces the wear or indentations with eventual breakage. In contrast, my arrangement results in line contact of the cylindrical sidewalls 46 of the cup 42 against the sides of the grooves 36, this line contact being produced by similar line contact of the needle bearings 40 against the inside of the cylindrical side wall 46 of the cup, and also no less than line contact between the lugs 34 and the bearings 40. In this way excellent load distribution is achieved.

In accordance with the patent statutes, I have described the principles of construction and operation of my front wheel drive systems for vehicles, and while I have endeavored to set forth the best embodiment thereof, I desire to have it understood that obvious changes may be made within the scope of the following claim without departing from the spirit of my invention.

I claim:

In a drive mechanism, a drive shaft, a hub slidably supported on said drive shaft at one end thereof, a series of projections extending radially outwardly from said hub, said projections having their axes in a common plane normal to the axis of said hub, cylindrically shaped extremities on said projections and coaxial therewith each extremity being provided with an annular groove adjacent its juncture with its associated projection, needle bearings encircling said extremities, cup-shaped means retaining said bearings in extremity encircling position, said cup shaped means including a cup shaped member for each cylindrically shaped extremity provided with an inturned flange engageable in a respective annular groove to releasably retain said cup shaped members in position, an outer member circumjacent said hub and having an inner spherical surface, the center of which coincides with the point of intersection between the drive shaft axis and said common plane, and a series of arcuate grooves in said inner surface, said grooves being centered along radial planes through the axis of said hub and being angularly spaced to accommodate the travel of said cup-shaped means retaining said needle bearings.

References Cited in the file of this patent

UNITED STATES PATENTS

| | | |
|---|---|---|
| 870,923 | Atkins | Nov. 12, 1907 |
| 1,021,924 | Fetzer | Apr. 2, 1912 |
| 1,269,068 | Evans | June 11, 1918 |
| 1,834,906 | Smith et al. | Dec. 1, 1931 |
| 1,940,779 | Williams | Dec. 26, 1933 |
| 2,293,717 | Dodge | Aug. 25, 1942 |
| 2,341,084 | Dodge | Feb. 8, 1944 |